United States Patent
Ciochina-Duchesne et al.

(10) Patent No.: US 9,929,797 B2
(45) Date of Patent: Mar. 27, 2018

(54) METHOD AND DEVICE FOR DETERMINING IF AT LEAST ONE INTERFERER GENERATED BY CROSS POLARIZATION INTERFERENCE IS PRESENT IN RECEIVED FRAME

(71) Applicant: MITSUBISHI ELECTRIC CORPORATION, Tokyo (JP)

(72) Inventors: Cristina Ciochina-Duchesne, Rennes (FR); Loic Brunel, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/520,525

(22) PCT Filed: Nov. 4, 2015

(86) PCT No.: PCT/JP2015/081673
§ 371 (c)(1),
(2) Date: Apr. 20, 2017

(87) PCT Pub. No.: WO2016/084601
PCT Pub. Date: Jun. 2, 2016

(65) Prior Publication Data
US 2017/0310383 A1    Oct. 26, 2017

(30) Foreign Application Priority Data

Nov. 27, 2014  (EP) .................................... 14195081

(51) Int. Cl.
*H04W 4/00* (2009.01)
*H04B 7/204* (2006.01)
*H04B 7/185* (2006.01)

(52) U.S. Cl.
CPC ....... *H04B 7/2041* (2013.01); *H04B 7/18523* (2013.01)

(58) Field of Classification Search
CPC ...... H04B 7/10; H04B 7/0408; H04B 7/0413; H04B 1/1027; H04B 7/0456; H04B 7/08; H04B 7/002; H04B 7/068; H04B 7/0617; H04W 24/02; H04W 88/08; H04W 16/28; H04W 72/04; H04W 72/046; H04W 56/00
See application file for complete search history.

(56) References Cited

U.S. PATENT DOCUMENTS

| | | |
|---|---|---|
| 6,308,080 B1 | 10/2001 | Burt et al. |
| 6,449,267 B1 | 9/2002 | Connors |
| 2003/0050015 A1 | 3/2003 | Kelly et al. |
| 2009/0086862 A1 | 4/2009 | Thesling et al. |
| 2012/0027141 A1 | 2/2012 | Petrovic et al. |

*Primary Examiner* — Kwasi Karikari
(74) *Attorney, Agent, or Firm* — Birch, Stewart, Kolasch & Birch, LLP

(57) ABSTRACT

The present invention concerns a method for determining if at least one interferer generated by cross polarization interference is present in a received frame. The method comprises the steps of: —analyzing the received frame using a sliding window which analyzes at least a part of a first and second planes of the received frame, —determining a factor of merit for each position of the sliding window, —comparing each factor of merit to a threshold in order to determine if at least one interfered zone is present in the received frame, —analyzing the factors of merit in order to determine the number of interferers which are present in each interfered zone, —determining the start/end positions of each interferer in the first and second planes of the received frame.

15 Claims, 8 Drawing Sheets

METHOD AND DEVICE FOR DETERMINING IF AT LEAST ONE INTERFERER GENERATED BY CROSS POLARIZATION INTERFERENCE IS PRESENT IN RECEIVED FRAME

TECHNICAL FIELD

The present invention relates generally to a method and a device for determining if at least one interferer generated by cross polarization interference is present in a received frame.

BACKGROUND ART

In satellite communication systems, multi-beam satellites are used for increasing the system capacity. In order to improve the frequency reuse factor without significantly increasing the interference, adjacent beams usually make use of the same frequency with different polarizations. In the adjacent beams, independent signals may be transmitted onto the same frequency band by means of two orthogonal polarizations, like for example horizontal and vertical polarizations. Impairments appear when the polarized waveform travels through the troposphere. Besides waveform attenuation, rain and ice depolarization effects are also present and the orthogonality may be lost, which leads to crosstalk between the two polarizations.

SUMMARY OF INVENTION

Technical Problem

Crosspolar interference causes performance degradation at the receiver side. Mitigation techniques exist in order to reduce the performance degradation generated by crosspolar interference.

The existence and the nature of the interferer need to be known in order for the mitigation techniques to be efficient. Transmissions from a satellite to receivers on different polarizations are usually not coordinated. For a given receiver, the useful and the interfering signal frames may be not aligned, i.e. frames have different start/end positions in the time plane and they potentially occupy different bandwidths, pilot positions are different between the interfering frames, etc.

A receiver may suffer from crosspolar interference coming from signals transmitted by the same satellite to one or several other receivers, onto a part or the totality of the used bandwidth, during a part or the totality of the communication.

Solution to Problem

The present invention aims at detecting, in received signals, the location in the time and frequency planes of at least one interferer generated by crosspolar interference.

To that end, the present invention concerns a method for determining if at least one interferer generated by cross polarization interference is present in a received frame, characterized in that the method comprises the steps of:
analysing the received frame using a sliding window which analyses at least a part of a first and second planes of the received frame,
determining a factor of merit for each position of the sliding window,
comparing each factor of merit to a threshold in order to determine if at least one interfered zone is present in the received frame,
analysing the factors of merit in order to determine the number of interferers which are present in each interfered zone,
determining the start/end positions of each interferer in the first and second planes of the received frame.

The present invention concerns also a device for determining if at least one interferer generated by cross polarization interference is present in a received frame, characterized in that the device comprises:
portion for analysing the received frame using a sliding window which analyses at least a part of a first and second planes of the received frame,
portion for determining a factor of merit for each position of the sliding window,
portion for comparing each factor of merit to a threshold in order to determine if at least one interfered zone is present in the received frame,
portion for analysing the factors of merit in order to determine the number of interferers which are present in each interfered zone,
portion for determining the start/end positions of each interferer in the first and second planes of the received frame.

Thus, based on the knowledge of existence and position of at least one interferer in the received frame, interference mitigation can be employed to improve performance.

According to a particular feature, a part of the positions taken by the sliding windows are overlapping resulting in multi analysed areas and/or the positions taken by the sliding windows do not cover all the first and second planes of the received frame resulting in unanalysed areas and the method comprises further step of determining if the multi analysed areas or unanalysed areas belong to interfered zones.

Thus, sliding window position's granularity can be adapted, like for example, depending on the pilot density, to make a trade-off between detection accuracy and complexity.

According to a particular feature, adjusted factors of merit are attached to unanalysed or multi analysed areas.

Thus, detection accuracy can be improved.

According to a particular feature, for an unanalysed area, if two successive non-adjacent positions of sliding windows neighbouring the unanalysed area are not determined as belonging to interfered zones, the unanalysed area does not belong to an interfered zone or if two successive non-adjacent positions of sliding windows neighbouring the unanalysed area are determined as belonging to interfered zones with similar factors of merit, the two successive non-adjacent positions of sliding windows neighbouring the unanalysed area and the unanalysed area belong to the same interfered zone or if two successive non-adjacent positions of sliding windows neighbouring the unanalysed area are determined as belonging to interfered zones with non similar factors of merit, the two successive non-adjacent positions of sliding windows neighbouring the unanalysed area belong to two different interfered zones and the unanalysed area does not belong to any interfered zone or if only one of the two successive non-adjacent positions of sliding windows neighbouring the unanalysed area is determined as belonging to an interfered zone, the unanalysed area does not belong to the interfered zone.

Thus, complexity can be reduced by avoiding the analysis of certain areas, all in preserving the detection accuracy by making decisions on the existence of interference in the unanalysed areas.

According to a particular feature, for an unanalysed area, the belonging of the unanalysed area to an interfered zone is determined by a comparison of the average value of the factors of merit of non-adjacent positions of sliding windows neighbouring the unanalysed area to a threshold.

Thus, a reliable method for making decisions on the existence of interference in the unanalysed areas can be devised.

According to a particular feature, for an unanalysed area, the belonging of a part of the unanalysed area to an interfered zone is determined according to the factors of merit of non-adjacent positions of sliding windows neighbouring the unanalysed area.

Thus, decisions on the existence of interference in the unanalysed areas can be made with a finer granularity on parts of unanalysed areas.

According to a particular feature, for a multi analysed area, if an interfered zone is detected as present on at least one of the positions of the overlapping sliding windows resulting in the multi analysed area, the method comprises further step of deciding if the multi analysed area belongs to the interfered zone according to the factors of merit of the overlapping sliding windows resulting in the multi analysed area.

Thus, detection accuracy can be improved.

According to a particular feature, the positions taken by the sliding windows are adjacent.

Thus, all parts of the received frame are analysed without any multiple analysis.

According to a particular feature, the number of interferers comprised in each interfered zone is determined according to the size of the interfered zones and on the variations of factors of merit in the interfered zone.

Thus, several interferers can be detected in each interfered zone, refining the detection accuracy.

According to a particular feature, the number of interferers is determined in each of the interfered zones by forming blocks belonging to a same interferer according to factors of merits of the analysed, unanalysed and/or multi analysed areas in one of the planes, an analysed area being a part of the first and second planes of the received frame analysed only one time by the sliding window, and by deciding in the other plane whether adjacent blocks belong to the same interferer.

Thus, the nature of the interference does not change within each detected interferer.

According to a particular feature, the determining of the start/end positions of the interferers in the first and second planes is performed by averaging, for each interferer, the start/end positions of the interferer in the first plane, by averaging the start/end positions of the interferer in the second plane and retain the largest estimated area corresponding to an interferer having a rectangular shape.

Thus, the risk of missed interference detection on symbols near the estimated interferer borders is minimized.

According to a particular feature, the determining of the start/end positions of the interferers in the first and second planes is performed by averaging, for each interferer, the start/end positions of the interferer in the first plane, by averaging the start/end positions of the interferer in the second plane and retain the smallest estimated area corresponding to an interferer having a rectangular shape.

Thus, the risk of false positive interference detection on symbols near the estimated interferer borders is minimized.

According to a particular feature, the refining of the start/end positions of the interferers in the first and second planes is performed by averaging, for each interferer, the start/end positions of the interferer in the first plane, by averaging the start/end positions of the interferer in the second plane and retain the closest integer to the averages in order to obtain an interferer having a rectangular shape.

Thus, a trade off between the risk of missed interference detection and the risk of false positive interference detection on symbols near the detected interferer borders is performed.

According to a particular feature, the averaging of the start/end positions of each interferer is performed using weighting coefficients depending of factors of merit at the start/end positions in the first and second plane of the interferer.

Thus, reliable and flexible refinement of the interferer's borders can be achieved.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of example embodiments, the said description being produced with reference to the accompanying drawings.

DESCRIPTION OF EMBODIMENTS

Figure 1:
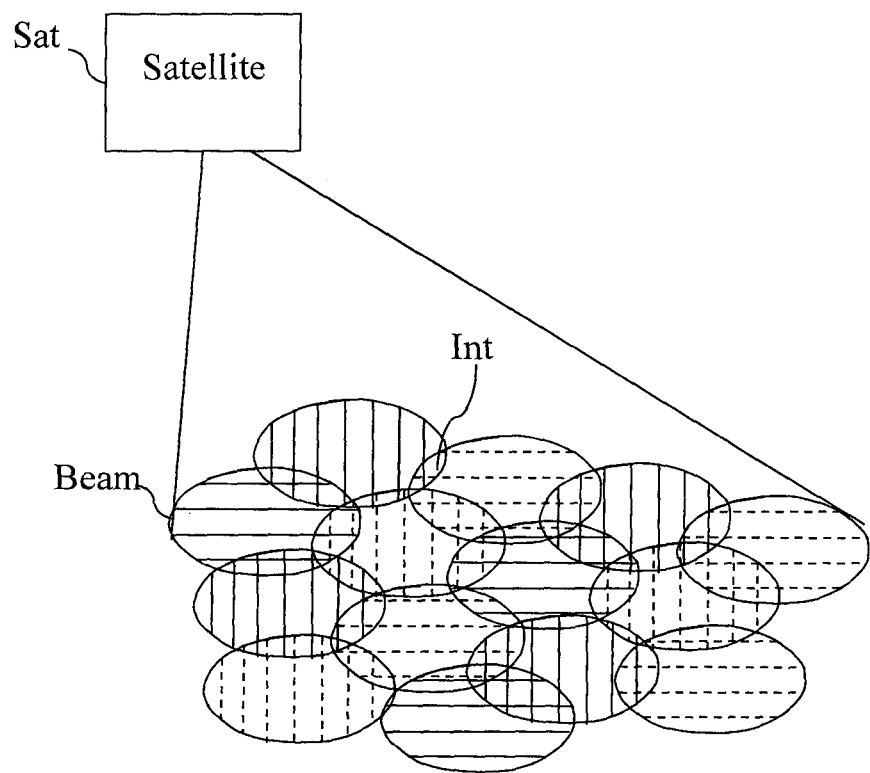
FIG. 1 represents a multibeam transmission performed by a satellite.

FIG. 1 represents a multibeam transmission performed by a satellite.

In the example of FIG. 1, a satellite Sat performs a multibeam transmission on two different frequency bands using different polarizations.

The beams filled with vertical solid lines are on a first frequency band and at a first polarization, the beams filled with vertical dotted lines are on a second frequency band and at the first polarization, the beams filled with horizontal solid lines are on the second frequency band and at the second polarization and the beams filled with horizontal dotted lines are on the first frequency band and at the second polarization.

When beams are overlapping and use the same frequency band with different polarizations and impairments appear when the polarized waveform travels through the troposphere, the orthogonality may be lost, which leads to crosstalk between the two polarizations. Crosspolar interference causes performance degradation at the receiver side.

According to the example of FIG. 1, the area Int is a zone wherein beams use the same frequency band with different polarizations and are overlapping.

According to the invention, a receiver Rec, not shown in FIG. 1, detects, in a received frame, the location in a first and second planes of the received frame, of at least one interferer generated by cross polarization interference.

The receiver Rec:
- analyses the received frame using a sliding window which analyses at least a part of the first and second planes,
- determines a factor of merit for each position of the sliding window,
- compares each factor of merit to a threshold in order to determine at least one interfered zone,
- identifies at least one interferer in each identified interfered zone,
- refines the start end positions of the interfered zones in the first and second planes.

Figure 2:
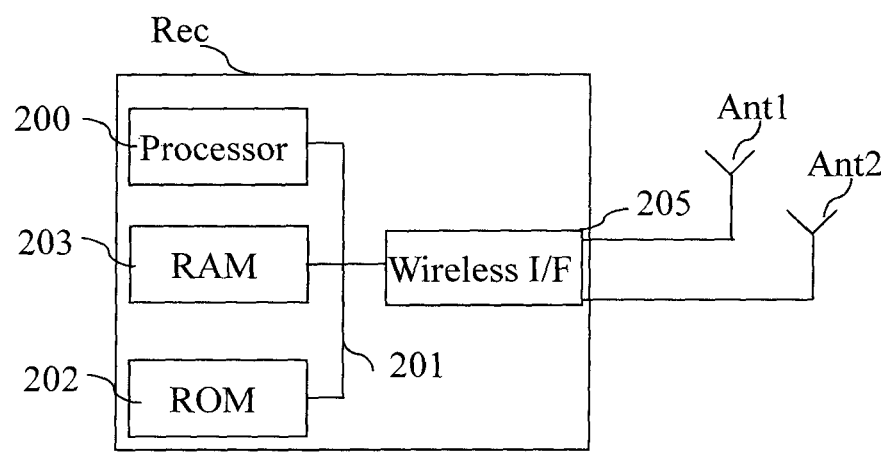
FIG. 2 is a diagram representing the architecture of a receiver in which the present invention is implemented.

FIG. 2 is a diagram representing the architecture of a receiver in which the present invention is implemented.

Figure 4:
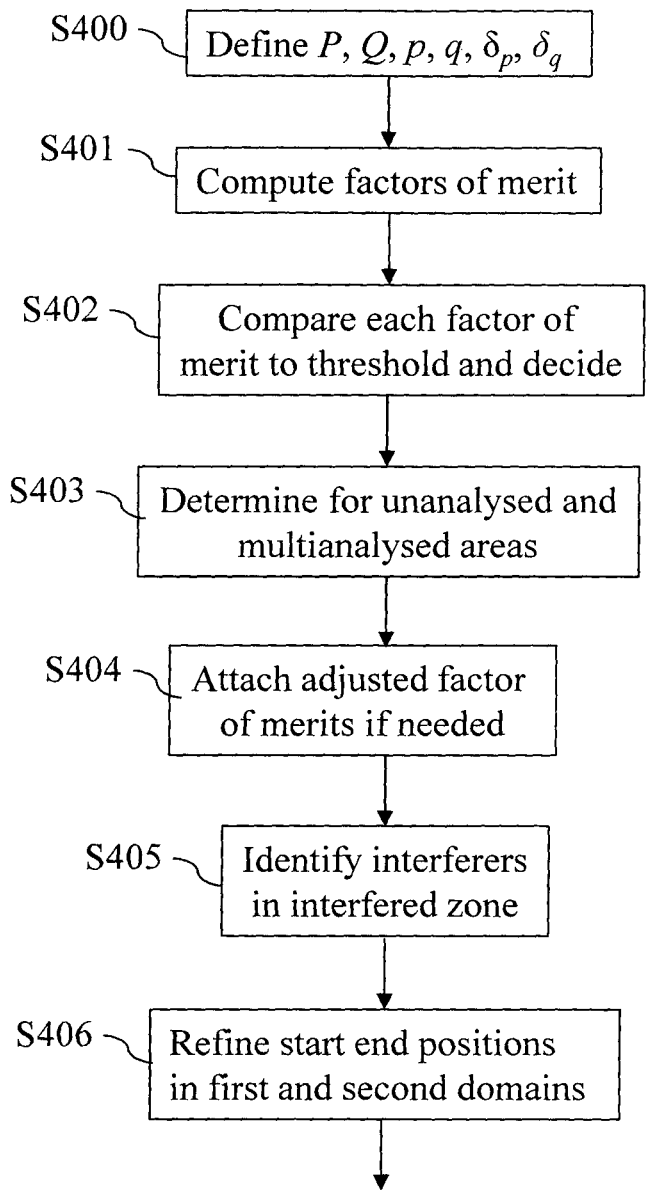
FIG. 4 represents an algorithm executed by the receiver Rec according to the present invention.

The receiver Rec has, for example, an architecture based on components connected together by a bus 201 and a processor 200 controlled by the programs as disclosed in FIG. 4.

The bus 201 links the processor 200 to a read only memory ROM 202, a random access memory RAM 203 and a wireless interface 205.

The memory 203 contains registers intended to receive variables and the instructions of the programs related to the algorithm as disclosed in FIG. 4.

The processor 200 controls the operation of the wireless interface 205.

The read only memory 202 contains instructions of the programs related to the algorithms as disclosed in FIG. 4, which are transferred, when the receiver Rec is powered on, to the random access memory 203.

The wireless interface 205 comprises two antennas Ant1 and Ant2.

Any and all steps of the algorithms described hereafter with regard to FIG. 4 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver Rec includes circuitry, or a device including circuitry, causing the receiver Rec to perform the steps of the algorithms described hereafter with regard to FIG. 4.

The wireless interface 205 detects simultaneously both polarizations. In the absence of an interferer, the received signal on the two polarizations may be written as:

$$y_1 = h_1 s_1 + n_1$$

$$y_2 = h_1 A s_1 + n_2$$

where $s_1$ is the symbol transmitted by the satellite Sat on one polarization and intended for the receiver Rec, $h_1$ is the channel experienced by the symbol transmitted from the satellite Sat on said polarization and received by the receiver Rec, A is the crosspolar attenuation and $n_1, n_2$ represent the additive white Gaussian noise of variance $\sigma_n^2$ on the two receive antennas.

In the presence of an interferer, the above equation rewrites as $$y'_1 = h_1 s_1 + h_2 A s_2 + n_1$$

$$y'_2 = h_1 A s_1 + h_2 s_2 + n_2$$

where $s_2$ is the interfering symbol transmitted by the satellite Sat on the second polarization intended for another receiver and $h_2$ is the channel experienced by the interfering symbol transmitted from the satellite Sat on the other polarization and received by the receiver Rec.

The channel between the satellite Sat and the receiver Rec is supposed static during the transmission. Since the receiver Rec is at a given and stable position and in line of sight with the satellite Sat, the channel between the satellite Sat and the receiver Rec can be decomposed as:

$$h_1 = a_1 b$$

$$h_2 = a_1 b$$

where $a_1$ and $a_2$ represent antenna gains b is the atmospheric attenuation due to atmospheric conditions. Since for a given receiver not moving during the transmission, the distance between the satellite Sat and the receiver Rec does not change, the free space propagation loss between the satellite Sat and the receiver Rec is known and is omitted in the following. It can be considered as included either in the antenna gains or in the atmospheric attenuation. This propagation loss will not be mentioned explicitly any longer and it is omitted in the following.

$h_1$ is the channel experienced by the symbol transmitted from the satellite Sat on polarization intended for the receiver Rec and received by the receiver Rec and $h_2$ is the channel experienced by the interfering symbol transmitted from the satellite Sat on the other polarization and received by the receiver Rec.

Atmospheric attenuation b is quasi-static and is given by the atmospheric conditions in the reception area. Atmospheric attenuation b is thus the same for both polarizations. Crosspolar attenuation A depends on the atmospheric attenuation b due to atmospheric conditions.

Antenna gains depend on the radiation pattern on the satellite Sat side and the antenna characteristics of the receiver Rec side, including antenna orientation. The gains $a_1$ and $a_2$ are composed of a gain $a_i^{Tx}$ at the satellite Sat side and a gain $a_i^{Rx}$ at the receiver Rec and $a_i = a_i^{Tx} a_i^{Rx}$, with $i=\{1,2\}$.

The transmit antenna patterns may be different for the two polarizations. For example the signal intended to the receiver Rec is received in the direction of the main lobe of the satellite antenna for one polarization, while the crosspolar interfering signal may be received in the direction of a secondary lobe, the main lobe of the crosspolar transmission creating the adjacent beam.

The satellite Sat antenna transmit pattern creates at the terrestrial surface a footprint. A fixed receiver Rec is able to know the satellite footprint corresponding to its location, and thus know $a_1^{Tx}$ and $a_2^{Tx}$, via a map or other information provided by the satellite Sat operator.

The values $a_1^{Tx}$ and $a_2^{Tx}$ are quasi-static for fixed receivers and are to be updated only in case of changes in the configuration of the satellite beams, or a change of position of the receiver Rec for example.

Periodic or on-request updates of the values $a_{1,2}^{Tx}$ may be executed. The same reasoning stands for the attenuation due to free space propagation loss between the satellite Sat and the receiver Rec, which will not be further mentioned explicitly.

The receiving antennas Ant1 and Ant2 characteristics are known by the receiver Rec, as they are a build-in parameter, but the practical receiving antenna gain $a_1^{Rx}, a_2^{Rx}$ may vary in function of the quality of the antennas alignment for example. The receiver Rec is able to estimate or acquire knowledge of $a_1^{Rx}, a_2^{Rx}$ during a calibration phase. Such a calibration may occur, for example, at each position change of the receiver Rec, or on regular basis.

Usually, $a_1^{Rx} = a_2^{Rx}$.

The receiver Rec has thus knowledge of $a_1$ and $a_2$.

On pilot positions, the transmitted useful signal is a known training sequence z. The receiver Rec has no knowledge of the nature of the interfering signal transmitted on the same positions. The receiver Rec is able to compute, on pilot positions:

$$E\{z^* y'_1\} = E\{z^*(h_1 z + h_2 A s_2 + n_1)\} = h_1 E\{|z|^2\} = a_1 b E\{|z|^2\}$$

$$E\{z^* y'_2\} = E\{z^*(h_1 A z + h_2 s_2 + n_2)\} = h_1 A E\{z^2\} = a_1 b A E\{|z|^2\}$$

where $E\{.\}$ is the mean value, z denotes pilot symbols and * denotes the complex conjugate. These average values may be computed including at most all the pilot symbols in the received frame. Less positions may be considered in order to reduce the number of computations. In that case, a sufficient number of pilot symbols needs to be averaged in order for the statistic to be reliable.

The processor 200 may compute the estimated value $\tilde{h}_1$ of the useful channel $h_1$ using any classical channel estimation methods, as, for example, based on pilot symbols.

The receiver Rec can thus determine estimates $\tilde{b}$ and respectively $\tilde{A}$ of the atmospheric attenuation b and the crosspolar attenuation A as:

$$\tilde{b} = E\{z^* y'_1\}/(a_1 E\{|z|^2\})$$

and respectively $$\tilde{A} = E\{\{z^* y'_2\}/(a_1 \tilde{b} E\{|z|^2\})$$

In a variant, the estimated value $\tilde{b}$ of atmospheric attenuation b can also be computed as:

$$\tilde{b} = \tilde{h}_1/a_1$$

Another means of computing the estimated value $\tilde{A}$ of the crosspolar attenuation is to compute:

$$\tilde{A} = E\{z^* y'_2\}/E\{z^* y'_1\}$$

or to compute $$\tilde{A} = E\{z^* y'_2\}/(\tilde{h}_1 E\{|z|^2\})$$

The receiver Rec can estimate the values of the different attenuations $\tilde{A}, \tilde{b}$ and can compute the estimated values $\tilde{h}_1, \tilde{h}_2$ of the channels $h_1, h_2$ without prior knowledge of the existence of the interferer.

Based on the particular nature of the channel between the satellite Sat and the receiver Rec, the processor 200 is able to compute the estimated value $\tilde{h}_2$ of the interfering channel $h_2$, without prior knowledge of the interferer and without any interference mitigation schemes implemented at the transmitter side as $$\tilde{h}_2 = a_2 \tilde{b}$$

In order to further estimate the interferer's power, the receiver Rec needs to average received samples over several subcarriers/time slots during which the nature of the interference does not change. Thus, a reliable method of identifying such intervals is needed. Pilot average power is sometimes considered to be unitary.

Figure 3:
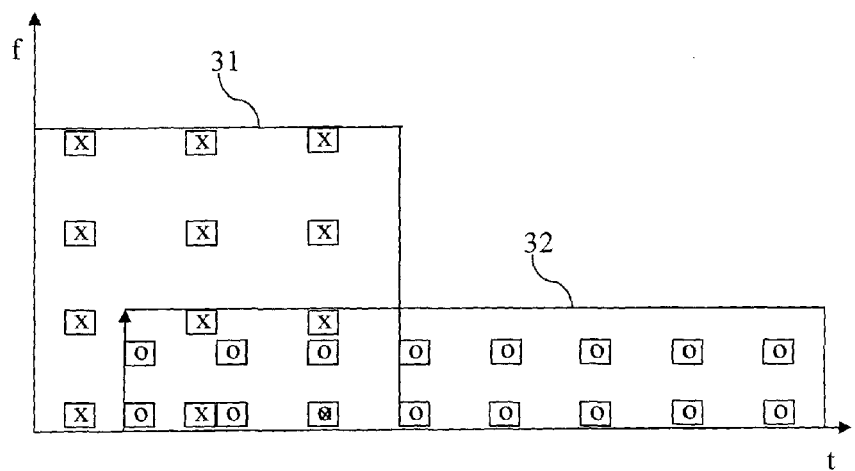
FIG. 3 represents an example of a crosspolar interferer frame overlapping in the time and frequency planes with the useful data frame at the receiver side.

FIG. 3 represents an example of a crosspolar interferer frame overlapping in the time and frequency planes with the useful data frame at the receiver side.

The horizontal axis represents the time plane and the vertical axis represents the frequency plane.

A first frame 31 is sent on one polarization, and a second frame 32 is sent on a second polarization by the satellite Sat.

Without loss of generality, let us assume that frame 31 is the useful signal intended for the receiver Rec and that frame 32 is intended for another receiver in an adjacent beam. When the polarized waveform travels through the troposphere, impairments appear, the orthogonality is lost, which leads to crosstalk between the two polarizations and thus the second frame 32 becomes a crosspolar interferer for the first frame 31.

The frames 31 and 32 may have a different length, as shown in FIG. 3 and may totally or partially overlap each other. Both frames 31 and 32 contain data and pilots. The pilot positions of frame 31 are noted x and the pilot positions of frame 32 are noted o.

The useful frame 31 and the interfering frame 32 are not aligned and the transmission of their respective pilot sequences is not coordinated. The two frames have different start/end positions in the time plane and they occupy different bandwidths. Data/pilots of frame 31 can be interfered by data/pilots of frame 32 or can be interference free. The receiver Rec has no prior knowledge of the existence, position or structure of the interfering frame 32.

FIG. 4 represents an algorithm executed by the receiver Rec according to the present invention.

More precisely, the present algorithm is executed by the processor 200 of the receiver Rec.

At step S400, the processor 200 determines a suitable size (P,Q), spacing (p, q) and first positioning ($\delta_p$, $\delta_q$) for the sliding windows.

It has to be noted that step S400 is executed only once at the beginning of the reception or during installation of the receiver Rec.

Sliding windows analyse the time/frequency plane first in a first plane (time or frequency), and then in a second plane (frequency or time respectively).

For example, sliding windows analyse the time/frequency plane row-wise: the sliding window progresses horizontally forming analysed rows in the first plane, and then passes to the next row to cover the second plane.

Figure 5:
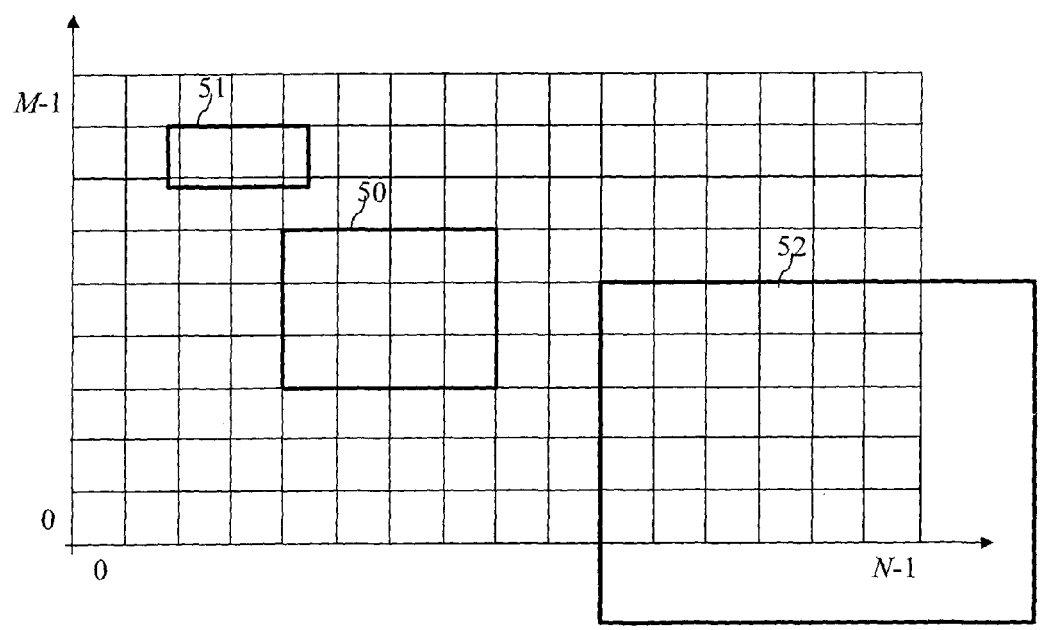
FIG. 5 represents an example of two interferers generated by crosspolar interference overlapping with the received frame and a sliding window used according to the present invention for determining the location in the time and frequency planes of at least one interferer generated by crosspolar interference.

FIG. 5 represents a first example of two interferers generated by crosspolar interference overlapping with the received frame and a sliding window used according to the present invention for determining the location in the time and frequency planes of at least one interferer generated by crosspolar interference.

The received frame is on the horizontal axis between 0 and N−1 and on the vertical axis between 0 and M−1.

According to the present invention, the received frame is analysed with the sliding window. The sliding window at a given position is noted 50 in FIG. 5 and two interferers 51 and 52 are shown.

Sliding windows analyse the time/frequency plane. For example, the received frame is composed of N time-plane symbols, containing M active subcarriers each. In the case of multicarrier systems like for example OFDM, OFDMA, SC-FDMA, MC-CDMA . . . ) M>1. In single-carrier systems, M=1. Then, in FIG. 5, the time plane starts from null value to N−1 and the frequency plane starts from null value to M−1.

Alternatively, sliding windows analyse the time/frequency plane column-wise. The sliding window progresses vertically forming analysed columns in the first plane, and then passes to the next column to cover the second plane. For the sake of simplicity, it is assumed in the following that rows correspond to the time plane and columns to the frequency plane. It has to be noted here that by making a different choice for the order of the planes, the present invention still applies.

For example, the sliding window has a size P×Q, P≤N, Q≤M.

Values of P, Q are to be chosen by making a trade-off between the reliability of a computed factor of merit and a missed detection probability. Large values of P, Q give more useful samples for the computation of the factor of merit and increase the reliability of the computed value but they lead to increased missed detection probability. Indeed, for example, interferer 51 in FIG. 5 having an inferior size with respect to the sliding window size may not be detected.

Small values of P, Q lead to a low reliability of the computed factor of merit since not enough useful samples are taken into account. In all systems, interference may be tolerated to a certain degree. Very-small interferers, not impacting significantly the performance, do not need to be mitigated, since computational complexity would be spent for negligible performance gains.

Significant interferers need to be mitigated, since their mitigation can significantly improve the performance.

A reasonable size for the sliding window should be in the order of the small significant interferers, with the constraint of including sufficient useful samples for a reliable computation of the factor of merit.

The analysis window can be slid with a granularity of p and respectively q in the time/frequency plane, where 1≤p and 1≤q. Low values of p, q give finer estimations of the position of the interferer but require higher computational complexity. p, q should be at least higher than the minimum spacing of the useful samples (e.g. pilot symbols in the time and frequency plane respectively).

Usually, p≤P and q≤Q and successive intervals covered by the sliding window overlap or are adjacent. Otherwise, some parts of the signal may remain unanalysed.

Higher values for p, q may be also taken, with some constraints on the size of the unanalysed parts of the signal. For example, p, q are superior to but close to P and Q respectively, in such a manner that the unanalysed intervals would at most contain negligible interferers.

In another example, p, q are superior to P and Q respectively in such a manner that the unanalysed area does not contain any/enough useful samples. This is typically the case when useful samples are irregularly spaced, and the largest time/frequency spacing between useful samples is similar or superior to P, Q respectively. In this case, the unanalysed area is considered as interference free.

Two-dimensional zones in the time/frequency plane susceptible of suffering from important interference are identified.

For example, the sliding window analyses rows with a granularity of p symbols and then columns with a granularity of q symbols. P' is the number of different positions of the sliding window in the first plane, for example corresponding to the time plane:

$$P' = \text{floor}\left(\frac{N - P - \delta_p}{p}\right) + 1$$

where $\delta_p$ indicates the index of the first position of the sliding window in the first plane for the analysed row.

P' thus also denotes the number of analysed columns.

Figure 6:
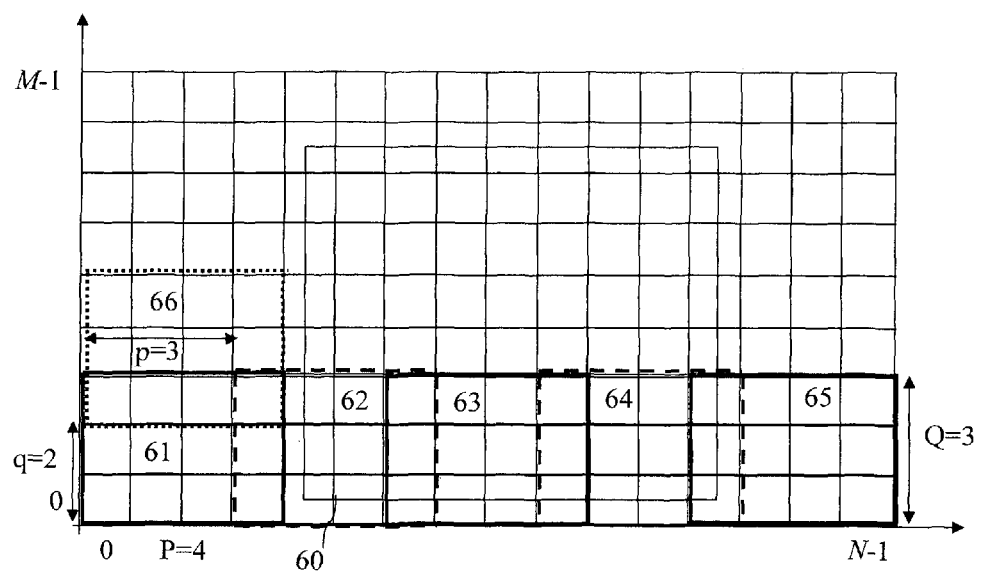
FIG. 6 represents an example of different positions taken by the sliding window in order to determine the location of an interferer.

FIG. 6 represents an example of different positions taken by the sliding window in order to determine the location of an interferer.

In FIG. 6, the time-frequency plane is N=16 slots in the first plane (e.g. here, time slots) and M=9 slots in the second plane (e.g., here frequency slots or subcarriers).

Q' is the number of different positions of the sliding window in the second plane, that is, the number of analysed rows.

$$Q' = \text{floor}\left(\frac{M - Q - \delta_q}{q}\right) + 1$$

$\delta_q$ indicates the lowest index of a subcarrier included in a sliding window in the second plane.

In the example of FIG. 6 M=9, N=16, Q=3, P=4. If, for example, q=2, p=3 and $\delta_q=\delta_p=0$, we can compute the number of analysed rows as Q'=4. The sliding window can have P'=5 different positions in the first plane, here, the time plane.

The interferer is noted 60 in FIG. 6.

The FIG. 6 shows different positions 61 to 65 taken by the sliding window in the first analysed row and one position 66 in the second row.

The sliding window moves in the first row from positions 61 to 65 and then moves to the first position 66 of the second row.

At next step S401, the processor 200 determines a factor of merit for each position of the sliding window.

According to the invention, an interferer is detected in the area analysed by the sliding window based on a computed factor of merit. The factor of merit is computed by taking into account useful samples, that can be all or part of the samples in the sliding window. For example, useful samples may be pilot symbols received within the sliding window.

For each position of the sliding window, in the absence of the interference:

$$E\{|y_1 - \tilde{h}_1 z|^2\} = \sigma_n^2 + \epsilon_1$$

$$E\{|y_2 - \tilde{h}_1 \tilde{A} z|^2\} = \sigma_n^2 + \epsilon_2$$

where $\epsilon_1$, $\epsilon_2$ represent the effect of the estimation errors and $\sigma_n^2$ is the noise variance $$\epsilon_1 = E\{|(h_1 - \tilde{h}_1) z|^2\}$$

$$\epsilon_2 = E\{|(h_1 A - \tilde{h}_1 \tilde{A}) z|^2\}$$

For example, the factor of merit may be computed as $$F = |E\{|y_2 - \tilde{h}_1 \tilde{A} z|^2\} - E\{|y_1 - \tilde{h}_1 z|^2\}| = |\epsilon_2 - \epsilon_1|$$

In the absence of interference, the two averages $E\{|y_1 - \tilde{h}_1 z|^2\}$ and $E\{|y_2 - \tilde{h}_1 \tilde{A} z|^2\}$ have rather similar values, e.g. less than 10% of difference, if the estimation errors are small enough.

For each position of the sliding window, in the presence of the interference:

$$E\{|y'_1 - \tilde{h}_1 z|_2\} = |h_2 A|^2 \sigma_{s_2}^2 + \sigma_n^2 + \epsilon_1$$

$$E\{|y'_2 - \tilde{h}_1 \tilde{A} z|_2\} = |h_2|_2 \sigma_{s_2}^2 + \sigma_n^2 + \epsilon_2$$

where $\sigma_{s_2}^2$ is the average power of the interfering symbol $s_2$.

In the presence of interference, the two averages $E\{|y'_1 - \tilde{h}_4 z|^2\}$ and $E\{y'_2 - \tilde{h}_1 \tilde{A} z|^2\}$ have rather different values. Indeed, the crosspolar isolation is usually high and thus crosspolar attenuation values are usually much smaller than 1.

The factor of merit becomes:

$$F' = |E\{|y'_2 - \tilde{h}_1 \tilde{A} z|^2\} - E\{|y'_1 - \tilde{h}_1 z|^2\}| = ||h_2|^2 (1 - |A|^2) \sigma_{s_2}^2 + \epsilon_2 - \epsilon_1|$$

Other factors of merit can be computed based on, for example, the ratio $E\{|y_2 - \tilde{h}_1 \tilde{A} z|^2\} / E\{|y_1 - \tilde{h}_1 z|^2\}$ or $E\{|y_1 - \tilde{h}_1 z|^2\} / E\{|y_2 - \tilde{h}_1 \tilde{A} z|^2\}$.

The factor of merit is an indicator of the reliability of the decision.

At next step S402, the processor 200 compares each factor of merit with a predetermined threshold.

The factor of merit F' in the presence of the interference is higher than the factor of merit F in the absence of interference.

Thus, comparing the factor of merit to a certain threshold, it is possible to determine if interference is present or not in the analysed sliding window.

The threshold can be a fixed value or a variable value depending, for example, of the noise level when this level is known.

If other factors of merit are computed based on, for example, the ratio $E\{|y_2 - \tilde{h}_1 \tilde{A} z|^2\} / E\{|y_1 - \tilde{h}_1|^2\}$ or $E\{|y_1 - \tilde{h}_1 z|^2\} / E\{|y_2 - \tilde{h}_1 \tilde{A} z|^2\}$, the factor of merit is compared to the value one. Values close to one indicate the absence of interference, while values rather different from one indicate the presence of interference. The degree of difference can be fixed or variable, for example, depending on the noise level when the noise level is known.

Figure 7:
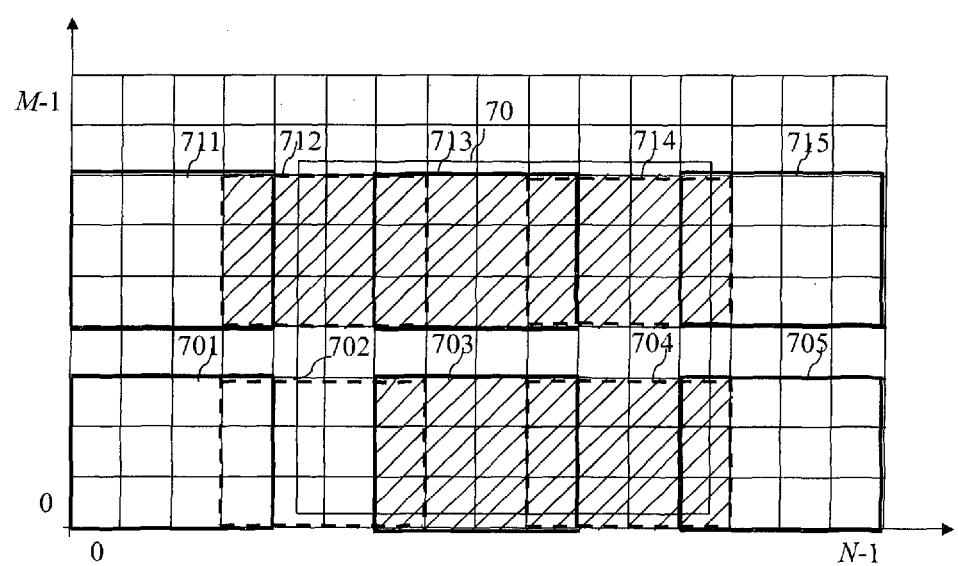
FIG. 7 represents an example of interference detection/non detection at different positions of a sliding window.

An example of decision if sliding windows comprise interferer is given in reference with FIG. 7.

FIG. 7 represents an example of interference detection/non detection at different positions of a sliding window.

In the example of FIG. 7, P=4, Q=3, p=3 q=4 and $\delta_2 = \delta_q = 0$. This leads to Q'=2 analysed rows with P'=5 positions of the sliding window on each analysed row.

Hatched sliding window positions have a factor of merit indicating the presence of interference, e.g. which is upper than the threshold, and non hatched sliding window positions have a factor of merit indicating the absence of interference, e.g. which is lower than the threshold.

The interferer is noted 70 in FIG. 7.

The sliding window takes the positions noted 701 to 705 in the first analysed row and the positions 711 to 715 in the second analysed row.

The positions 702, 703, 704, 713 and 714 correspond to positions wherein the presence of interference is detected depending on the result of comparing as described in reference to step S402.

At next step S403, the processor 200 determines if interference exists in unanalysed areas and multi analysed areas.

According to the example of FIG. 7, the area between the first and second analysed rows is an unanalysed area.

According to the example of FIG. 7, the area with index M−1=8 and M−2=7 in the second plane is an unanalysed area.

According to the example of FIG. 7, multi analysed areas are covered by at least two sliding windows.

Multi analysed areas are the intersection areas of 701 and 702, 702 and 703, 703 and 704, 704 and 705, 711 and 712, 712 and 713, 713 and 714, and 714 and 715.

Areas not comprised between two analysed areas (e.g. rows with index $0 \ldots \delta_q - 1$, columns with index $0 \ldots \delta_p - 1$ or rows/columns with index in the second/first plane superior to the highest index corresponding to a row/column including parts of a sliding window) are considered interference free.

If in two neighbouring non-adjacent sliding windows (p>P in the first plane, or q>Q in the second plane) do not detect any interference, it is decided that no interference is present in the unanalysed area in-between these two sliding windows either.

If in two neighbouring non-adjacent sliding windows interference is detected with similar factors of merit, e.g. less than 10% of difference, it is determined that interference covers both windows and also the unanalysed area in-between these two sliding windows.

If two neighbouring non-adjacent sliding windows detect interference but the factors of merit are significantly different, it is determined that the detected interference is caused by two distinct interferers and that the unanalysed area is interference free.

If two neighbouring non-adjacent sliding windows have different decisions, the unanalysed area is either considered as interference free, or a decision based on one or both of the values of the factors of merit of adjacent sliding windows is performed.

For example, a decision is made by comparing the average value of the factors of merit in the adjacent sliding windows with a threshold.

For example, a decision is made by splitting the unanalysed area in two parts that may be equal, or may be proportional to the factors of merit of adjacent sliding windows with the condition of respecting the existing frequency granularity, and attach to each such part the factor of merit and the decision of the adjacent sliding window or unanalysed areas.

If successive sliding windows are adjacent, p=P in first plane, or q=Q in the second plane, in a first rough estimation, it is determined that all symbols in a sliding window detected as interfered suffer interference, and all symbols in a sliding window detected as interference-free do not suffer interference.

If the successive positions of the sliding windows overlap, p<P in the first plane, and/or q<Q in the second plane, a decision concerning the symbols belonging to more than one sliding window needs to be performed when the different sliding windows including the symbol have different detection decisions.

For example, the average value of the different factors of merit of the sliding windows including the symbol is determined and compared to a threshold.

For example, if the symbol is only in two sliding windows with different detection decisions then the symbol is considered as interfered.

For example, if the symbol is only in two sliding windows with different detection decisions then the symbol is considered as non-interfered.

For example, if the symbol is in more than two sliding windows, the decision is taken by selecting the one which corresponds to the majority of the decisions taken in the sliding windows the symbol belongs to.

For example, last decision in chronological order prevails.

For example, positive detection decision prevails.

After that, the processor 200 moves to step S404 according to a particular mode of realization of the present invention or to step S405.

At next step S404, the processor 200 attaches adjusted factors of merit to unanalysed or multi analysed areas if needed.

Adjusted factors of merit are the values determined or decided at the previous step S403 for the unanalysed or multi analysed areas onto which the decision of interference or absence of interference was taken, e.g. average of the factors of merit of the overlapping windows for the multi analysed areas, or one of the factors of merit of neighbouring windows for unanalysed areas between sliding windows with different decisions, or average of the factors of merit of the adjacent sliding windows for unanalysed areas between two successive non-adjacent sliding windows where interference is detected with similar factors of merit, e.g. less than 10% of difference, or the factor of merit of the last analysed window the multi analysed area belongs to.

At step S405, the processor 200 identifies interferers in interfered zones based on an analysis of the factors of merit in the zone.

The processor 200 decides for each interfered zone identified if the zone corresponds to one or to several adjacent interferers.

The simplest means of identifying is to assume that each zone corresponds to a single interferer, regardless of the size and of the variations of corresponding factors of merit.

In a more refined approach, identification will be based on the size of the zone and on the variations of factors of merit of the samples in the zone.

The processor 200 proceeds, for example, by rows and then by columns. Here, rows denote either the analysed rows or the non-analysed rows detected as interfered and having refined factors of merit.

Row-wise, the processor 200 denotes blocks which are formed e.g. by several successive sliding windows and eventually the unanalysed areas in-between them representing a same interferer. On unanalysed rows the reasoning is the same, the processor 200 replaces sliding windows with portions of unanalysed areas having the same attached factor of merit or the same span as a neighbouring sliding window. Column-wise, the processor 200 decides if adjacent blocks also belong to the same interferer.

The zones including one single sliding window belong to a same interferer.

If the size of the sliding window is very large, for example including more than twice the number of useful samples necessary for a reliable estimation, the processor 200 may re-analyse the zone using smaller sliding windows for a finer granularity.

The processor 200 proceeds for each row, as follows.

The small zones having a dimension in a first domain inferior or equal to a span of for example $P''=3$ successive sliding windows, that is, containing at most $(P''-1)p+P$ samples, belong to a same block.

For rows including two adjacent or overlapping sliding windows in the first domain, if the two factors of merit are significantly different in the two windows, a refined start/end of the block in the first domain may be computed (e.g. weighted average of the start/end positions, weighting being proportional to the factors of merit of the 2 sliding windows). Zones including $P''+1=4$ or more successive sliding windows in the first domain belong to a same interferer in that domain if the factors of merit are similar with a certain tolerance, e.g. less than 10% of difference.

For large zones, factors of merit of the start/end sliding windows may be eliminated from the analysis since those sliding windows are susceptible of including interference only on a portion of the sliding window and the attached factors of merit are thus less reliable.

Two adjacent interferers with different characteristics are signalled by a durable change in the values of factors of merit of the sliding windows if they are overlapping or adjacent, or of the symbols if the successive sliding windows are separated by unanalysed areas.

Two close non-adjacent interferers with different characteristics are signalled by a non-durable drop of the value of the factor of merit, and by a durable change in the values of factors of merit after the drop.

For all other cases, if the nature of the two interferers is similar, the processor 200 assimilates the two interferers to a single interferer.

The processor 200 decides that the current sliding window marks the start of a new block in the first domain if the value of the factor of merit of the current sliding window is significantly different from the average value of at least a part of the factors of merit of the precedent sliding windows identified as belonging to a same interferer, and if the difference is observed for at least a predetermined number of successive sliding windows.

If the zone comprises two or more analysed windows in the other domain, in order to validate a change of interferer, such a change must be detected, for example with a certain tolerance, e.g. +/−1 sliding window in the following analysed windows in the other domain (or in the following predetermined number of analysed windows in the other domain). The processor 200 computes an average factor of merit per block before passing to the analysis in the second domain.

In the second domain, the processor 200 decides whether adjacent blocks belong to a same interferer.

If the analysed block is adjacent to more than one block from the next row, the processor 200 checks only the block from the next row having the largest common border with the analysed block as performed in the first domain, by replacing sliding windows by blocks, and factors of merit attached to each sliding window or unanalysed area by average factors of merit attached to each block. The totality of blocks identified as belonging to a same interferer denotes interferer Ii.

A number of distinct interferers $I_i$ has thus been identified.

At step S406, the processor 200 refines start/end positions in the first and second planes.

Let $I_i$ be the ith identified interferer, delimited by a set of start/end indices $K_i = \{(k_{START,i}^1, k_{END,i}^1), \ldots, (k_{START,i}^{M_i}, k_{END,i}^{M_i})\}$ in the first plane and by a set of start/end indices $L_i = \{(l_{START,i}^1, l_{END,i}^1), \ldots, (l_{START,i}^{N_i}, l_{END,i}^{N_i})\}$ in the second plane where $M_i$, $N_i$ are the maximum rough spans in the second and respectively the first plane of the ith identified interferer $I_i$.

The ith interferer $I_i$ is delimited by a set of indices obtained by averaging the start/end positions in the first/second plane, all in respecting the time/frequency granularity. Averaging can be made in several manners:

Retain the largest estimated area corresponding to an interferer having a rectangular shape $$k_{START,i} = \text{floor}\left(\frac{1}{\sum_{j=1}^{M_i} \alpha_i^j} \sum_{j=1}^{M_i} \alpha_i^j k_{START,i}^j\right),$$

$$k_{END,i} = \text{ceil}\left(\frac{1}{\sum_{j=1}^{M_i} \alpha_i'^j} \sum_{j=1}^{M_i} \alpha_i'^j k_{END,i}^j\right)$$

$$l_{START,i} = \text{floor}\left(\frac{1}{\sum_{j=1}^{N_i} \alpha_i''^j} \sum_{j=1}^{N_i} \alpha_i''^j l_{START,i}^j\right),$$

$$l_{END,i} = \text{ceil}\left(\frac{1}{\sum_{j=1}^{N_i} \alpha_i'''^j} \sum_{j=1}^{N_i} \alpha_i'''^j l_{END,i}^j\right)$$

where $\alpha_i^j$, $\alpha_i'^j$, $\alpha_i''^j$, $\alpha_i'''^j$ are either equal or confidence factors depending, for example, on the value of the factors of merit attached to the symbols at the start/end of each row/column, e.g. $\alpha_i''^j$ depends on the factor of merit of the symbol belonging to the interferer $I_i$, having index $l_{START,i}^j$ in the second plane and located on the jth column of symbols belonging to interferer $I_i$. $\alpha_i^j$, $\alpha_i'^j$, $\alpha_i''^j$, $\alpha_i'''^j$ may also be chosen equal among them.

Retain the smallest estimated area corresponding to an interferer having a rectangular shape:

$$k'_{START,i} = \text{ceil}\left(\frac{1}{\sum_{j=1}^{M_i} \alpha_i^j} \sum_{j=1}^{M_i} \alpha_i^j k_{START,i}^j\right),$$

$$k'_{END,i} = \text{floor}\left(\frac{1}{\sum_{j=1}^{M_i} \alpha_i'^j} \sum_{j=1}^{M_i} \alpha_i'^j k_{END,i}^j\right)$$

$$l'_{START,i} = \text{ceil}\left(\frac{1}{\sum_{j=1}^{N_i} \alpha_i''^j} \sum_{j=1}^{N_i} \alpha_i''^j l_{START,i}^j\right),$$

$$l'_{END,i} = \text{floor}\left(\frac{1}{\sum_{j=1}^{N_i} \alpha_i'''^j} \sum_{j=1}^{N_i} \alpha_i'''^j l_{END,i}^j\right)$$

In this case, the estimated size of the interferer is the smallest possible, and the probability of including in the estimated interferer samples not belonging to the real interferer is thus minimized. This can reduce the estimation errors of the values computed based on intervals during which the nature of the interference does not change.

Retain the closest integer index closest to the weighted average of indexes:

$$k''_{START,i} = \text{round}\left(\frac{1}{\sum_{j=1}^{M_i} \alpha_i^j} \sum_{j=1}^{M_i} \alpha_i^j k_{START,i}^j\right),$$

$$k''_{END,i} = \text{round}\left(\frac{1}{\sum_{j=1}^{M_i} \alpha_i'^j} \sum_{j=1}^{M_i} \alpha_i'^j k_{END,i}^j\right)$$

$$l''_{START,i} = \text{round}\left(\frac{1}{\sum_{j=1}^{N_i} \alpha_i''^j} \sum_{j=1}^{N_i} \alpha_i''^j l_{START,i}^j\right),$$

$$l''_{END,i} = \text{round}\left(\frac{1}{\sum_{j=1}^{N_i} \alpha_i'''^j} \sum_{j=1}^{N_i} \alpha_i'''^j l_{END,i}^j\right)$$

The processor 200 has thus calculated refined start/end positions in the first and second plane for each identified interferer and has identified groups of time/frequency slots during which the nature of the interference does not change (i.e. belonging to the same interferer).

If refined interferers appear as superposed, the processor 200 can either use average values in the superposition areas (e.g. interferer power in the superposition area is considered as the average power of the superposing interferers), or refine the superposing borders for the dimension where the superposition is the smallest. In this latter case, for example if $k_{END,1} < k_{START,2}$ and $l_{START,1} < l_{END,2}$ and $k_{START,2} - k_{END,1} < l_{END,2} - l_{START,1}$, then the processor 200 refines the borders for the smallest dimension of the superposing area, as $k^{sup}_{END,1} + 1 = k^{sup}_{START,2} = (k_{END,1} + k_{START,2} + 1)/2$.

In a particular mode of realization, $$\varepsilon_1 = E\{|(h_1 - \tilde{h}_1)z|^2\}$$

$$\varepsilon_2 = E\{|(h_1 A - \tilde{h}_1 \tilde{A})z|^2\}$$

and $F = E\{|y_2 - \tilde{h}_1 \tilde{A}z|^2\} - E\{|y_1 - \tilde{h}_1 z|_2\}| = |\varepsilon_2 - \varepsilon_1|$ may be re-evaluated within each identified interferer.

Figure 8:
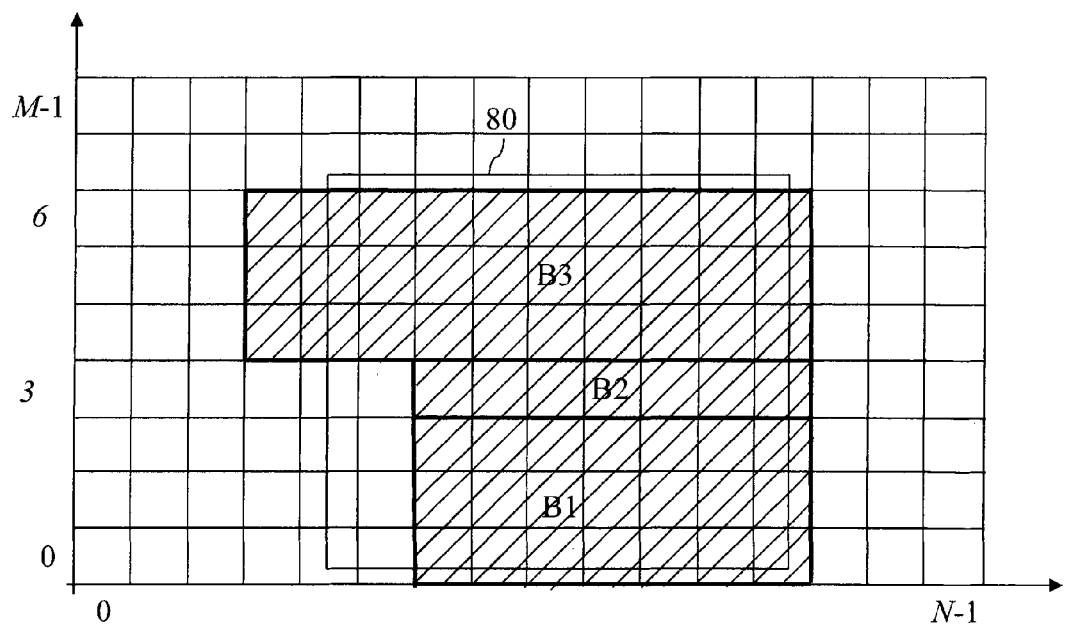
FIG. 8 represents different blocks identified at step S405 of FIG. 4 for the example of FIG. 7 according to the present invention.

FIG. 8 represents different blocks identified at step S405 of FIG. 4 for the example of FIG. 7 according to the present invention.

The interferer is noted 80 and the hatched area represents the interfered zone determined at steps S402 through S404.

At step S405, the processor 200 decides that the hatched area contains three blocks B1, B2 and B3.

The first row is the first analysed row with index 0-2 in the second domain. It contains only one block B1 since it corresponds to less than 3 window spans.

The second row is the unanalysed area determined, by the processor 200 as interfered at step S403. The second row has index 3 in the second domain. The processor 200 decides that the second row contains one block B2 since the unanalysed area corresponds to less than 3 window spans.

The third row is the second analysed row with index 4-6 in the second domain. The processor 200 decides that the third row contains one block B3 formed by three window spans.

In the second domain, the blocks B1, B2 and B3 are adjacent and have similar average factors of merit, e.g. less than 10% of difference. The processor 200 thus decides at step S403 that a single interferer $I_1$ exists. The interferer $I_1$ spans over $M_1=7$ second domain positions and $N_1=10$ first domain positions.

Figure 9:
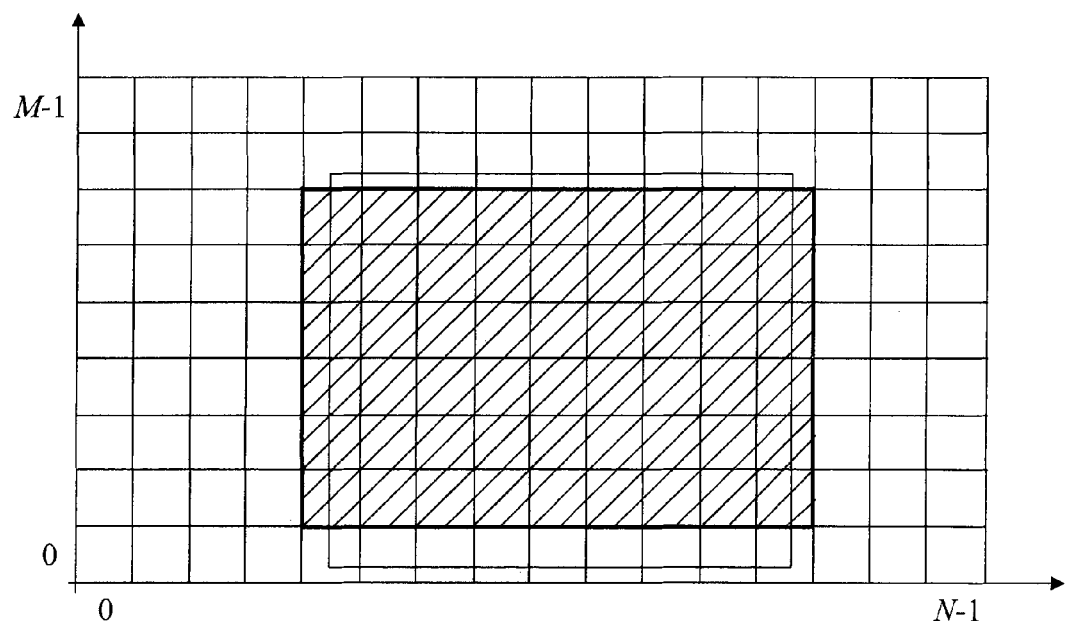
FIG. 9 represents the refined start/end positions determined at step S406 according to the example of FIGS. 7 and 8.

FIG. 9 represents the refined start/end positions determined at step S406 according to the example of FIGS. 7 and 8.

The refined start/end positions and interferers are the hatched area.

Corresponding index range of interferer as depicted in FIG. 8 is $(k_{START,1}^1 \cdots ^4, k_{END,1}^1 \cdots ^4)=(6,12)$, $(k_{START,1}^5 \cdots ^7, k_{END,1}^5 \cdots ^7)=(3,12)$, $(k_{START,1}^1 \cdots ^3, k_{END,1}^1 \cdots ^3)=(4,6)$, $(k_{START,1}^4 \cdots ^{10}, k_{END,1}^4 \cdots ^{10})=(0,6)$.

Considering all weighting coefficients $\alpha_1^j, \alpha'_1^j, \alpha''_1^j, \alpha'''_1^j$ equal among them, for example equal to one, the refined start/end/positions in the first and second domains are:

$$k_{START,1}=4, k_{END,1}=12$$

$$l_{START,1}=1, l_{END,1}=6$$

In a variant, different refined start/end positions can be computed as:

$$k'_{START,1}=5, k'_{END,1}=12$$

$$l'_{START,1}=2, l'_{END,1}=6$$

or as:

$$k''_{START,1}=5, k''_{END,1}=12$$

$$l''_{START,1}=1, l''_{END,1}=6$$

Figure 10:
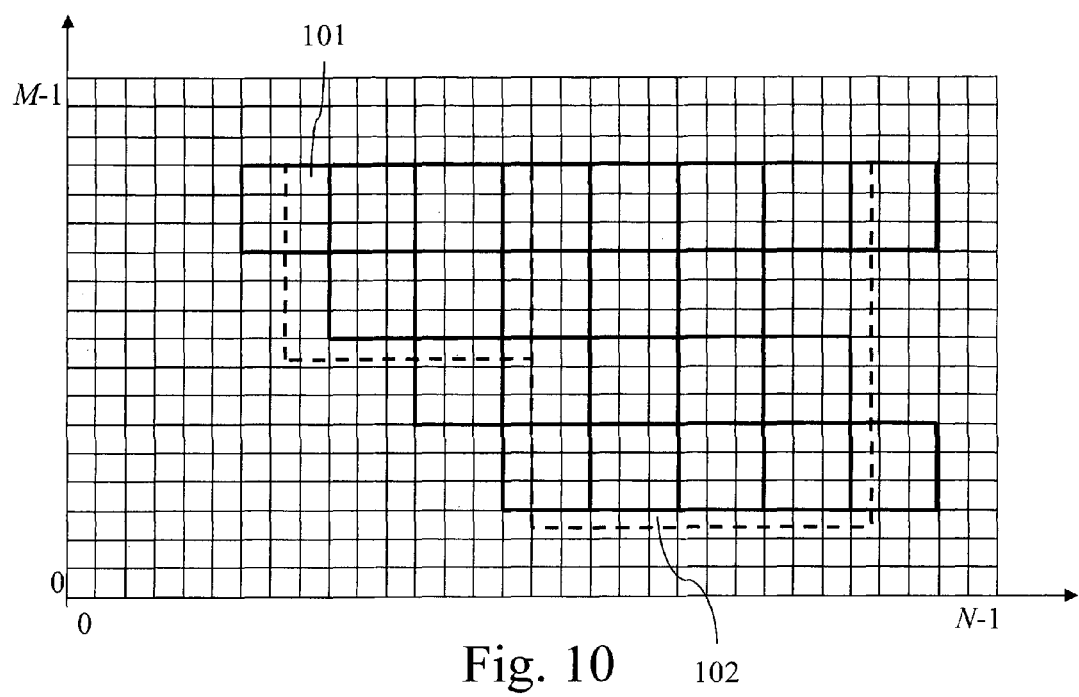
FIG. 10 represents a second example of different positions taken by the sliding window in order to determine the location of two interferers.

FIG. 10 represents a second example of different positions taken by the sliding window in order to determine the location of two interferers.

In the second example of FIG. 10, for a time-frequency plane of N=32 time slots and M=18 frequency slots (subcarriers).

At step S400, the processor 200 defines P=3 and Q=3, p=3, q=3, $\delta_p=\delta_q=0$. This leads to a P'=10 analysed columns and Q'=6 analysed rows. It has to be noted here that, in this particular example, the sliding windows are adjacent.

Two interferers noted 101 and 102 are shown in FIG. 10. The interferers 101 and 102 are delimited by dashed lines.

The sliding window positions shown in FIG. 10 as delimited by bold lines are the ones determined as interfered by the processor 200 at step S402 of FIG. 4.

Figure 11:
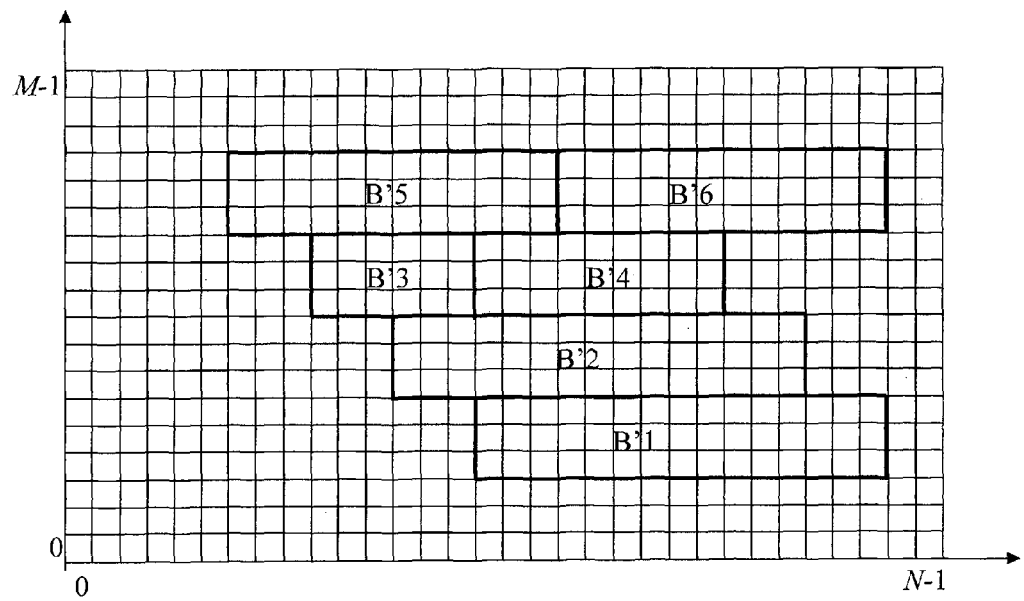
FIG. 11 represents different blocks identified at step S405 of FIG. 4 according to the present invention for the second example, depicted in FIG. 10.

FIG. 11 represents different blocks identified at step S405 of FIG. 4 according to the present invention for the second example, depicted in FIG. 10.

At step S405, the processor 200 identifies the interferers in the interfered zone, based on an analysis of the factors of merit in the zone, proceeding as following.

The first row is the second analysed row with index 3-5 in the second domain. It contains only block B'1 as the sliding windows at positions corresponding to B'1 have similar factors of merit.

The second row is the third analysed row with index 6-8 in the second domain. It contains one block B'2 as the sliding windows at positions corresponding to B'2 have similar factors of merit.

The third row is the fourth analysed row with index 9-11 in the second domain. It contains two blocks B'3 and B'4 as the sliding windows at positions corresponding to B'3 have similar factors of merit and as the sliding windows at positions corresponding to B'4 have similar factors of merit which are different from the ones corresponding to B'3.

The fourth row is the fifth analysed row with index 12-14 in the second domain. It contains two blocks B'5 and B'6 as the sliding windows at positions corresponding to B'5 have similar factors of merit and as the sliding windows at positions corresponding to B'6 have similar factors of merit which are different from the ones corresponding to B'5.

The processor 200 has thus identified the blocks B'1 to B'6. The processor 200 now proceeds to identifying the number of different interferers based on the identified blocks.

In the second plane, the block B'1 belongs to a $1^{st}$ interferer $I_1$. The block B'1 is adjacent to the block B'2, thus B'2 also belongs to $I_1$ (small size region).

The block B'2 is adjacent to the blocks B'3 and B'4. Since the largest common border is with the block B'4, the processor 200 decides that the block B'3 belongs to a second interferer $I_2$. The block B'4 belongs to the interferer $I_1$. The block B'3 is adjacent to the block B'5, thus B'5 belongs to the interferer $I_2$.

The block B'6 is susceptible of belonging to the interferer $I_1$. Since in the $2^{nd}$ dimension $I_1$ has now a dimension superior to three blocks, the processor 200 checks based on the average factors of merit of the blocks B'1, B'2, B'4 and B'6 if interferer $I_1$ needs to be further split in the second plane or not.

Figure 12:
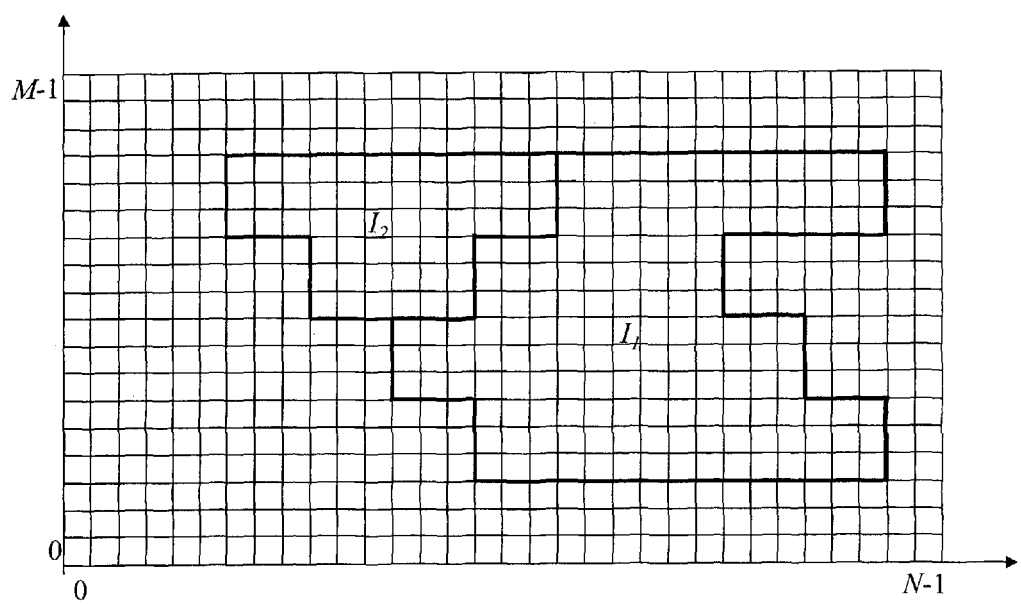
FIG. 12 represents two interferers detected according to the second example depicted in FIG. 10 and determined at step S405 of the present invention.

The processor 200 decides that two interferers exist, $I_1$ and $I_2$ as depicted in FIG. 12.

FIG. 12 represents two interferers detected according to the second example depicted in FIG. 10 and determined at step S405 of the present invention.

The interferer $I_1$ spans over $M'_1=6$ second plane positions and $N'_1=12$ first plane positions.

Corresponding index range is $(k_{START,1}^1 \cdots ^3, k_{END,1}^1 \cdots ^3)=(9,14)$, $(k_{START,1}^4 \cdots ^6, k_{END,1}^4 \cdots ^6)=(6,17)$, $(l_{START,1}^1 \cdots ^3, l_{END,1}^1 \cdots ^3)=(12,14)$, $(l_{START,1}^4 \cdots ^9, l_{END,1}^4 \cdots ^9)=(9,14)$ $(l_{START,1}^{10} \cdots ^{12}, l_{END,1}^{10} \cdots ^{12})=(12,14)$ for $I_1$.

The interferer $I_2$ spans over $M'_2=12$ second plane positions and $N'_2=18$ first plane positions.

Figure 13:
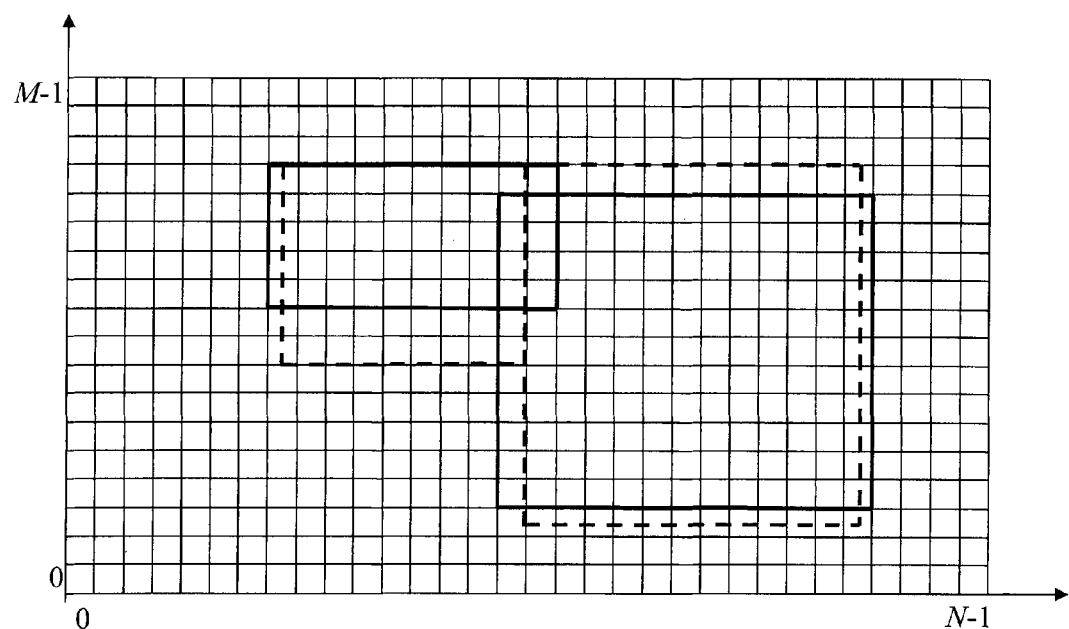
FIG. 13 represents the refined start/end positions determined at step S406 according to the second example, depicted in FIG. 10.

Corresponding index range is $(k_{START,2}^1 \cdots ^3, k_{END,2}^1 \cdots ^3)=(12,29)$, $(k_{START,2}^4 \cdots ^6, k_{END,2}^4 \cdots ^6)=(12,26)$, $(k_{START,2}^7 \cdots ^9, k_{END,2}^7 \cdots ^9)=(15,23)$, $(k_{START,2}^{10} \cdots ^{12}, k_{END,2}^{10} \cdots ^{12})=(18,29)$ $(l_{START,2}^1 \cdots ^3, l_{END,2}^1 \cdots ^3)=(6,8)$, $(l_{START,2}^4 \cdots ^6, l_{END,2}^4 \cdots ^6)=(3,11)$ $(l_{START,2}^7 \cdots ^{18}, l_{END,2}^7 \cdots ^{18})=(3,14)$ for interferer $I_2$ The refined start/end positions in the first and second plane for each identified interferer are shown in FIG. 13.

FIG. 13 represents the refined start/end positions determined at step S406 according to the second example of FIG. 10.

Considering all weighting coefficients $\alpha_1^j$, $\alpha'^j_1$, $\alpha''^j_1$, $\alpha'''^j_1$ $\alpha_2^j$, $\alpha'^j_2$, $\alpha''^j_2$, $\alpha'''^j_2$ equal among them, for example equal to one, the refined start/end positions determined at step S406 in the first and second planes are:

$$k_{START,1}=7, k_{END,1}=16 k_{START,2}=15, k_{END,2}=27$$

$$l_{START,1}=10, l_{END,1}=14 l_{START,2}=3, l_{END,1}=13$$

In a variant, different refined start/end positions can be computed as:

$$k'_{START,1}=8, k'_{END,1}=15 k'_{START,2}=15, k'_{END,2}=26$$

$$l'_{START,1}=11, l'_{END,1}=14 l'_{START,2}=4, l'_{END,2}=12$$

or as $$k''_{START,1}=8, k''_{END,1}=16 k''_{START,2}=15, k''_{END,2}=27$$

$$l''_{START,1}=10, l''_{END,1}=14 l''_{START,2}=4, l''_{END,2}=12$$

If refined interferers appear as superposed, the processor 200 can either use average values in the superposition areas (e.g. interferer power in the superposition area is considered as the average power of the superposing interferers), or refine the superposing borders for the dimension where the superposition is the smallest. In this latter case, for example if $k_{END,1} < k_{START,2}$ and $l_{START,1} < l_{END,2}$ and $k_{START,2} - k_{END,1} < l_{END,2} - l_{START,1}$, then the processor 200 refines the borders for the smallest dimension of the superposing area, as $k^{sup}_{END,1}+1=k^{sup}_{START,2}=(k_{END,1}+k_{START,2}+1)/2$.

Optionally, the processor 200 refines $k^{sup}_{END,1}+1=k^{sup}_{START,2}=16$

Obviously, what has been described here-above as being analysed first in the time and then in the frequency plane can be applied by analysing first the frequency and then the time plane.

Naturally, many modifications can be made to the embodiments of the invention described above without departing from the scope of the present invention.

INDUSTRIAL APPLICABILITY

The method and device of the present invention are applicable to many kinds of satellite communication systems.

The invention claimed is:

1. A method for determining if at least one interferer generated by cross polarization interference is present in a received frame, comprising the steps of:
analysing the received frame using a sliding window which analyses at least a part of a first and second planes of the received frame,
determining a factor of merit for each position of the sliding window,
comparing each factor of merit to a threshold in order to determine if at least one interfered zone is present in the received frame,
analysing the factors of merit in order to determine the number of interferers which are present in each interfered zone,
determining the start/end positions of each interferer in the first and second planes of the received frame.

2. The method according to claim 1, wherein a part of the positions taken by the sliding windows are overlapping resulting in multi analysed areas and/or the positions taken by the sliding windows do not cover all the first and second planes of the received frame resulting in unanalysed areas and in that the method comprises further step of determining if the multi analysed areas or unanalysed areas belong to interfered zones.

3. The method according to claim 2, wherein adjusted factors of merit are attached to unanalysed or multi analysed areas.

4. The method according to claim 2, wherein for an unanalysed area, if two successive non-adjacent positions of sliding windows neighbouring the unanalysed area are not determined as belonging to interfered zones, the unanalysed area does not belong to an interfered zone or if two successive non-adjacent positions of sliding windows neighbouring the unanalysed area are determined as belonging to interfered zones with similar factors of merit, the two successive non-adjacent positions of sliding windows neighbouring the unanalysed area and the unanalysed area belong to the same interfered zone or if two successive non-adjacent positions of sliding windows neighbouring the unanalysed area are determined as belonging to interfered zones with non similar factors of merit, the two successive non-adjacent positions of sliding windows neighbouring the unanalysed area belong to two different interfered zones and the unanalysed area does not belong to any interfered zone or if only one of the two successive non-adjacent positions of sliding windows neighbouring the unanalysed area is determined as belonging to an interfered zone, the unanalysed area does not belong to the interfered zone.

5. The method according to claim 2, wherein for an unanalysed area, the belonging of the unanalysed area to an interfered zone is determined by a comparison of the average value of the factors of merit of non-adjacent positions of sliding windows neighbouring the unanalysed area to a threshold.

6. The method according to claim 2, wherein for an unanalysed area, the belonging of a part of the unanalysed area to an interfered zone is determined according to the factors of merit of non-adjacent positions of sliding windows neighbouring the unanalysed area.

7. The method according to claim 2, wherein for a multi analysed area, if an interfered zone is detected as present on at least one of the positions of the overlapping sliding windows resulting in the multi analysed area, the method comprises further step of deciding if the multi analysed area belongs to the interfered zone according to the factors of merit of the overlapping sliding windows resulting in the multi analysed area.

8. The method according to claim 1, wherein the positions taken by the sliding windows are adjacent.

9. The method according to claim 1, wherein the number of interferers comprised in each interfered zone is determined according to the size of the interfered zones and on the variations of factors of merit in the interfered zone.

10. The method according to claim 9, wherein the number of interferers is determined in each of the interfered zones by forming blocks belonging to a same interferer according to factors of merits of the analysed, unanalysed and/or multi analysed areas in one of the planes, an analysed area being a part of the first and second planes of the received frame analysed only one time by the sliding window, and by deciding in the other plane whether adjacent blocks belong to the same interferer.

11. The method according to claim 1, wherein the determining of the start/end positions of the interferers in the first and second planes is performed by averaging, for each interferer, the start/end positions of the interferer in the first plane, by averaging the start/end positions of the interferer in the second plane and retain the largest estimated area corresponding to an interferer having a rectangular shape.

12. The method according to claim 1, wherein the determining of the start/end positions of the interferers in the first and second planes is performed by averaging, for each interferer, the start/end positions of the interferer in the first plane, by averaging the start/end positions of the interferer in the second plane and retain the smallest estimated area corresponding to an interferer having a rectangular shape.

13. The method according to claim 1, wherein the refining of the start/end positions of the interferers in the first and second planes is performed by averaging, for each interferer, the start/end positions of the interferer in the first plane, by averaging the start/end positions of the interferer in the second plane and retain the closest integer to the averages in order to obtain an interferer having a rectangular shape.

14. The method according to claim 11, wherein the averaging of the start/end positions of each interferer is performed using weighting coefficients depending of factors of merit at the start/end positions in the first and second plane of the interferer.

15. A device for determining if at least one interferer generated by cross polarization interference is present in a frame received via a wireless interface, wherein the device comprises:
a computer processor; and
a memory coupled to the computer processor, said memory storing computer-executable instructions which, when executed by the computer processor, performs the following
analysing the received frame using a sliding window which analyses at least a part of a first and second planes of the received frame,
determining a factor of merit for each position of the sliding window,
comparing each factor of merit to a threshold in order to determine if at least one interfered zone is present in the received frame,
analysing the factors of merit in order to determine the number of interferers which are present in each interfered zone,
determining the start/end positions of each interferer in the first and second planes of the received frame.

* * * * *